United States Patent
Ho et al.

(10) Patent No.: US 6,762,583 B2
(45) Date of Patent: Jul. 13, 2004

(54) NIGHTLIGHT BATTERY CHARGER

(75) Inventors: Shu Ming Ho, Sun Valley, CA (US); William Guo Li, Sun Valley, CA (US); Michael Kidakarn, Sun Valley, CA (US)

(73) Assignee: ADS Enterprise Inc., West Covina, CA (US)

( * ) Notice: Subject to any disclaimer, the term of this patent is extended or adjusted under 35 U.S.C. 154(b) by 0 days.

(21) Appl. No.: 10/007,939

(22) Filed: Dec. 10, 2001

(65) Prior Publication Data

US 2003/0107345 A1 Jun. 12, 2003

(51) Int. Cl.[7] .............................................. H01M 10/46
(52) U.S. Cl. ...................................................... 320/107
(58) Field of Search ................................. 320/107, 111, 320/113, 114, 115; 362/253, 365, 801

(56) References Cited

U.S. PATENT DOCUMENTS 4,611,264 A * 9/1986 Bradley
4,812,827 A * 3/1989 Scripps
6,312,271 B1 * 11/2001 Tseng

* cited by examiner

Primary Examiner—Edward H. Tso
(74) Attorney, Agent, or Firm—Raymond Y. Chan; David and Raymond Patent Group

(57) ABSTRACT

A nightlight battery charger is constructed to be normally plugged in a wall socket to function as a nightlight so that the user can easily find and locate the battery charger anytime whenever the user needs it. The nightlight battery charger includes a charger casing having a main casing and a battery cover, wherein the main casing has at least one battery compartment for at least a rechargeable battery to be disposed therein, an nightlight system which includes at least one illuminator for generating illumination, a plurality of battery terminals adapted for electrically connecting at least one rechargeable battery, a power input supplying power to light up the illumination unit, a recharging electric circuit electrically connected to the battery terminals and the power input for transmitting power to charge up the rechargeable battery t, and an exchangeable lens card for protecting the illumination unit.

12 Claims, 7 Drawing Sheets

NIGHTLIGHT BATTERY CHARGER

BACKGROUND OF THE PRESENT INVENTION

1. Field of Invention

The present invention relates to a charger, and more particularly to a nightlight battery charger that provides illumination and battery charging functions.

2. Description of Related Arts

Typical disposable batteries have been used extensively for varieties of electronic or electrical product such as portable fans, walkmans, CD-players, mini electronic game devices and the likes. Users are required to put one or more disposable batteries for power supply.

Almost all disposable batteries contain some substances that are harmful to environment and cause different degrees of hazardous effects to human beings. Also, each time when a disposable battery is used up, the user has to buy a new one to replace the old one. It is no doubt not very economical in long-term as compared with using an A.C. power supply. Thus, rechargeable batteries have been developed to provide D.C. power supply for electrical and electronic devices. Those rechargeable batteries, however, can be charged up by typical A.C. power supply by means of a charger. Therefore, they can be reused for a considerable period of time. What is needed is to charge up the used rechargeable battery. In light of this, a battery charger for charging up such rechargeable battery is required. For the sake of convenience and saving of valuable time, many people who have rechargeable batteries choose to recharge them at night, and more specifically, during they are sleeping. In doing so, they can have enough charged batteries in daytime and let their electrical and electronic devices function properly without being halted by out-of-battery problem.

Nowadays, each of the kids and teenagers owns a portable electronic game device such as the "Game Boy Advance", which is generally powered by batteries. However, since there is no specific location where a battery charger should be stored, nearly every kid has a problem of locating the battery charger when he or she needs to charge his or her batteries.

On the other hand, a lot of people, especially children, require nightlight at their bedrooms to provide dim illumination at night or in a dark environment when they are sleeping. Various nightlights have been commercially available to meet this demand. However, typical nightlights can only provide illumination and no more. Also, most nightlights are manufactured in a simple structure and shape without any decorative feature, and are not specifically designed to cater for children.

SUMMARY OF THE PRESENT INVENTION

It would be a great idea to provide a battery charger that can also be used as a nightlight. Therefore, a main object of the present invention is to provide a nightlight battery charger which can charge up at least one rechargeable battery and provide nightlight in a dark environment at the same time.

Another object of the present invention is to provide a battery charger which is constructed to be normally plugged in a wall socket to function as a nightlight, so that the user can easily find and locate the battery charger anytime whenever the user needs it. At the same time, the battery charge of the present invention can be fully functioned at all time while a conventional battery charger can do nothing when it is not being used to charge.

Another object of the present invention is to provide a nightlight battery charger which can be circuited to function as a nightlight device either when it is not functioned as a battery charger or while it is charging batteries.

Another object of the present invention is to provide a nightlight battery charger which is a portable device adapted for an interstate or oversea traveling young user to carry along with his or her electronic game device, so that he or she not only can charge his or her batteries elsewhere but also has a portable nightlight device to provide illumination by plugging the battery charger into the wall socket.

Another object of the present invention is to provide a nightlight battery charger which comprises a foldable plug unit which pair of plug pins are constructed to be foldable so that when it is not plugged to the wall socket, the plug unit can be folded up to electrically disconnect with the electric circuit and charge batteries inside the battery charger to prevent unwanted electrical contact with outside. Moreover, the projecting plug pins can be inwardly folded up to hide in a plug chamber to facilitate storage and carrying purposes. When the nightlight battery charger is in use, the lug unit can be unfolded out that electrically connects the plug pins with the electric circuit inside for plugging into the wall socket.

Another object of the present invention is to provide a nightlight battery charger wherein a concave surface of the light cavity functioned as a reflecting surface for the illuminator connected in the light cavity to enhance its illumination, wherein a lens card is positioned on top of the light cavity to cover and protect the illuminator, wherein the lens card detachably attached to the main casing so that it can selectively provide different interchangeable lens cards so as to enhance entertainment, decorative and lighting effects of the nightlight battery charger.

Another object of the present invention is to provide a nightlight battery charger which is easy to use, compact in size and safe for carry.

Accordingly, in order to accomplish the above objects, the present invention provides a nightlight battery charger comprising:

a charger casing having a main casing and a battery cover, wherein the main casing has at least one battery compartment for at least a rechargeable battery to be disposed therein;

a nightlight system which comprises at least one illuminator for generating illumination;

a plurality of battery terminals adapted for electrically connecting at least one rechargeable battery;

a power input supplying power to light up the illumination unit;

a recharging electric circuit electrically connected to the battery terminals and the power input for transmitting power to charge up the rechargeable battery; and an exchangeable lens card for protecting the illumination unit.

DETAILED DESCRIPTION OF THE PREFERRED EMBODIMENT

Figure 1:
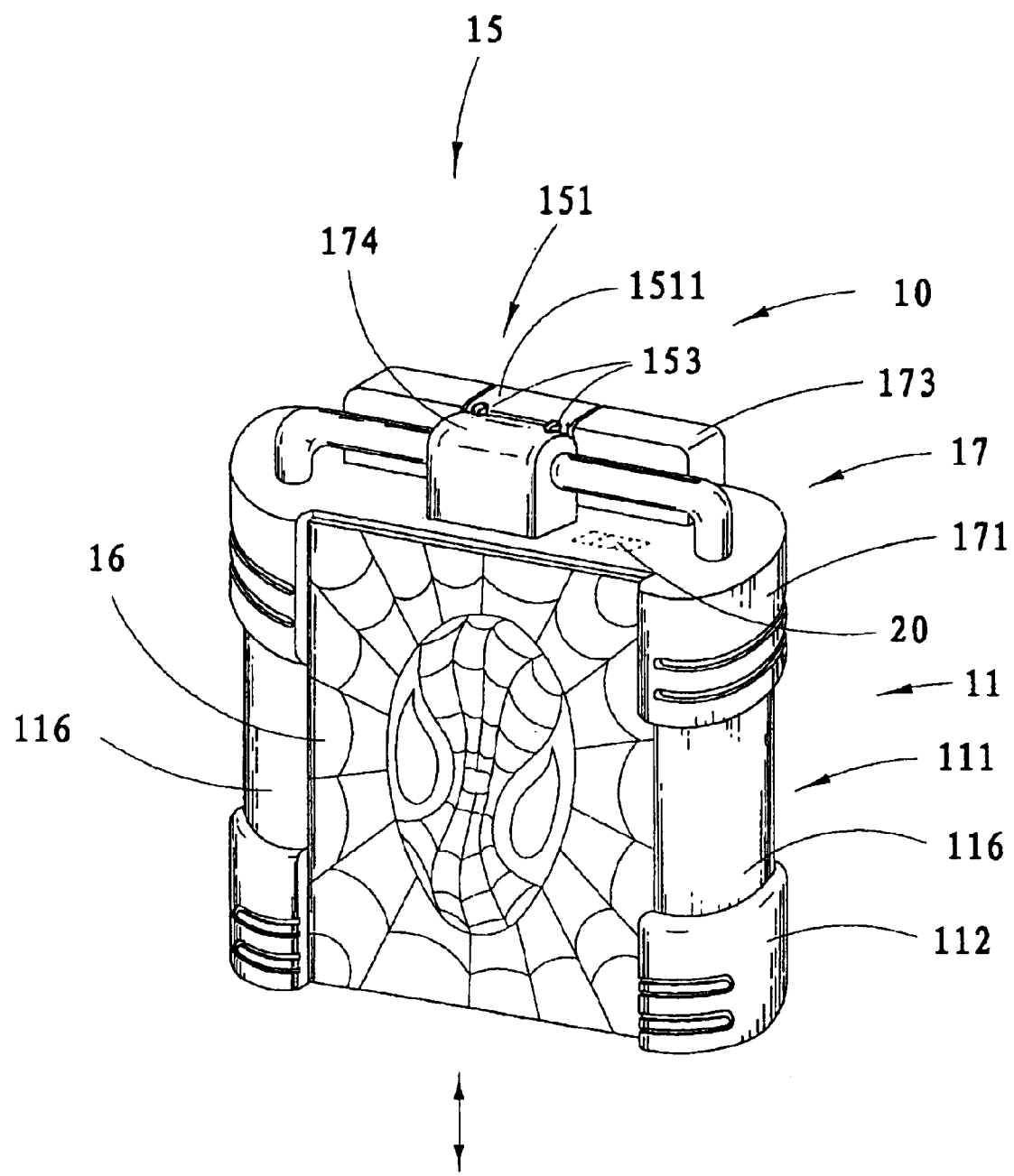
FIG. 1 is a front perspective view of a nightlight battery charger according to a preferred embodiment of the present invention.

Referring to FIGS. 1 to 5 of the drawings, a nightlight battery charger 10 according to a preferred embodiment of the present invention is illustrated. The nightlight battery charger 10 comprises a charger casing 11, a nightlight system 12, a plurality of battery terminals 13, an electric circuit 14 electrically connected to the battery terminals 13 and the nightlight system 12, a power input 15 electrically connected to the electric circuit 14, and a lens card 16 adapted for replacably covering the nightlight system 12 and providing an exchangeable lighting effect and a decorative effect for the nightlight battery charger 10.

Figure 2:
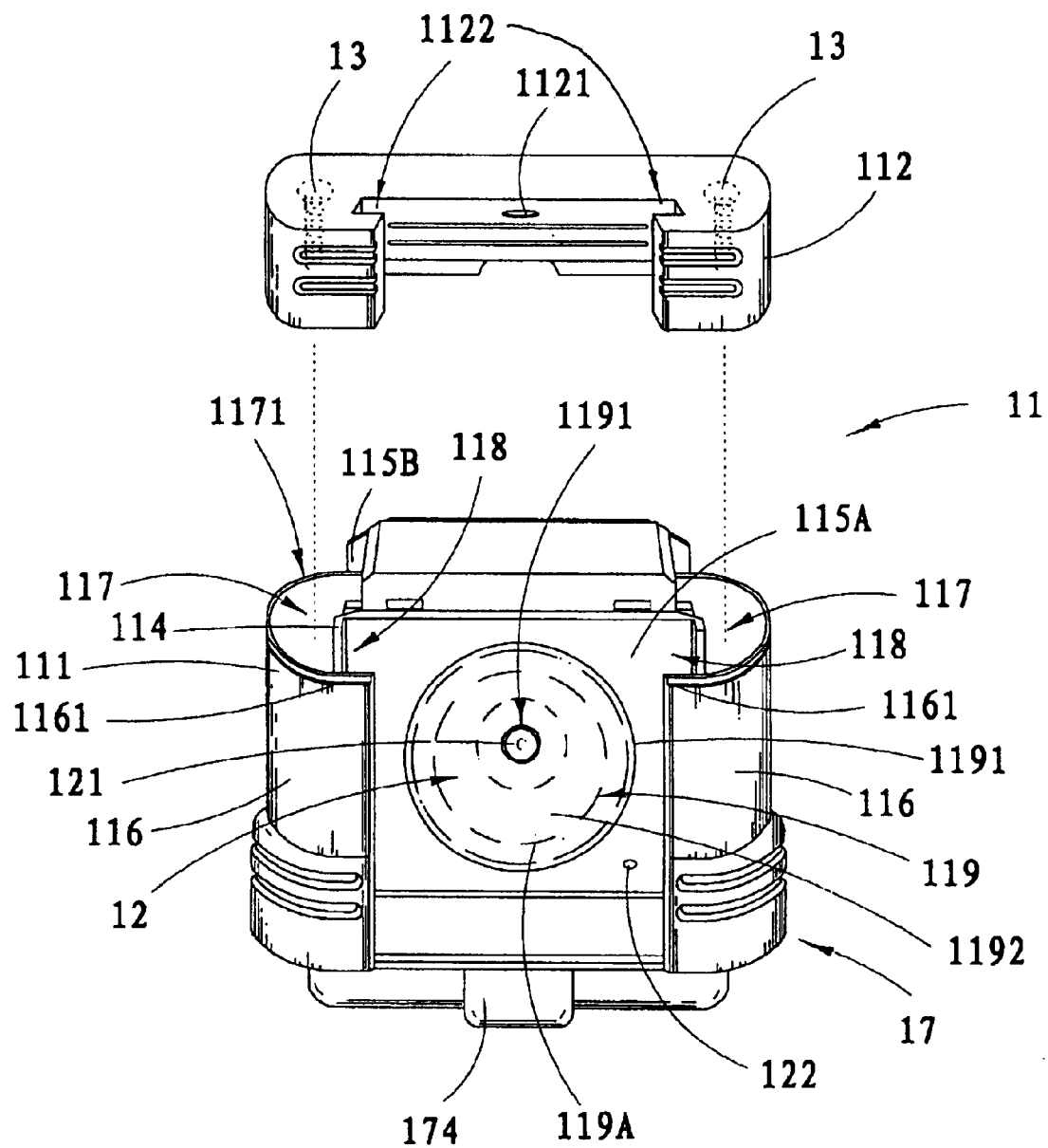
FIG. 2 is an exploded perspective view of the nightlight battery charger according to the above preferred embodiment of the present invention, wherein the battery cover is detached from the main casing.

As shown in FIG. 2, the charger casing 11 comprises a main casing 111 having a central interior cavity 111 between a front wall 115A and a bottom wall 115B thereof for storing and supporting the electric circuit 14 and two battery compartments 117 formed at two sides of the central interior cavity 1111 for storing and supporting two rechargeable batteries therein respectively.

According to the preferred embodiment of the present invention, the main casing 111 has a pair side ridges 114 frontwardly and integrally extended at two side edges of the front wall 115A of the main casing 111 and a pair of U-shaped panels 116 integrally provided at two side portions thereof to define the two cylindrical battery compartments 117 respectively for receiving the pair of rechargeable batteries therein respectively.

Figure 3:
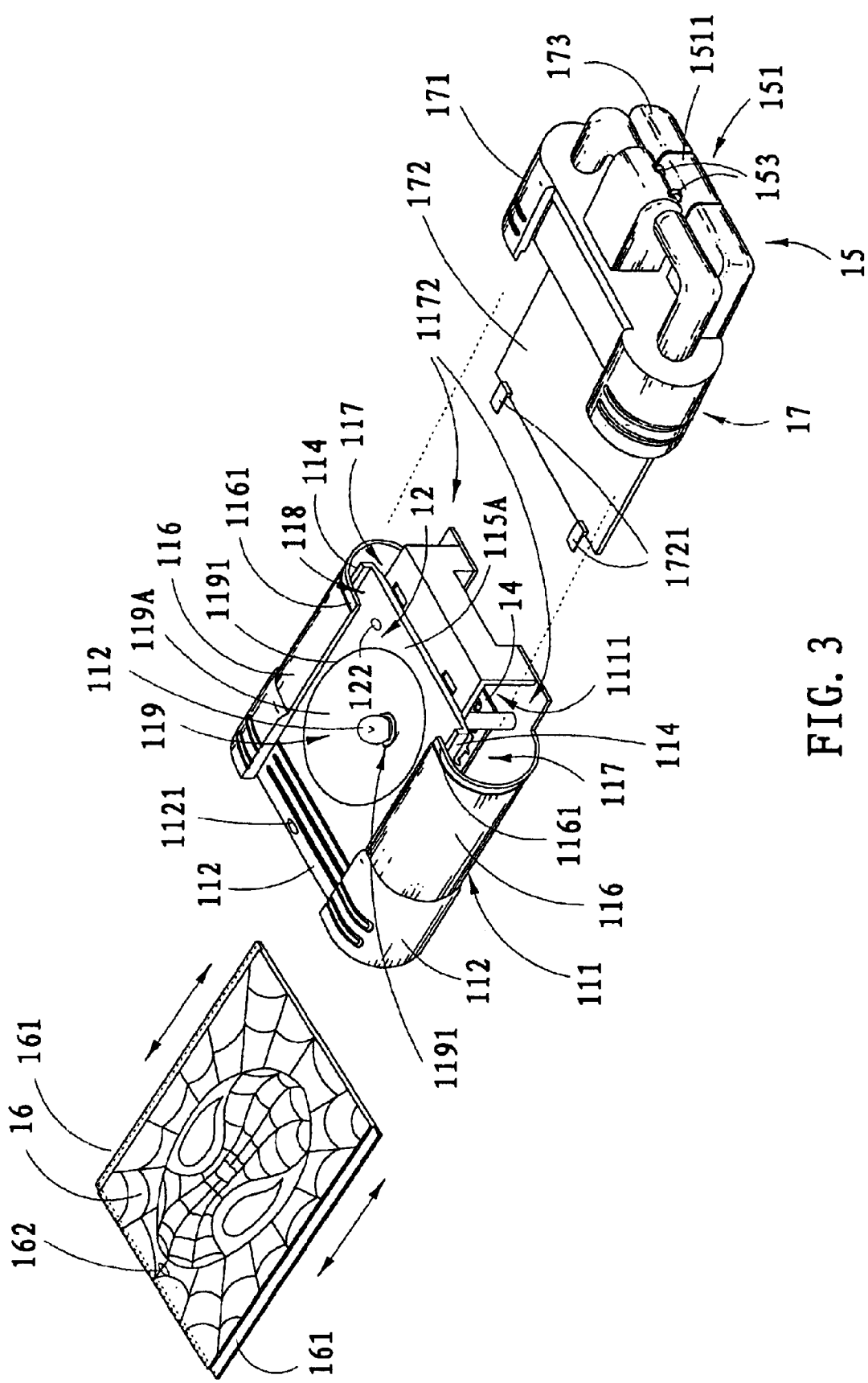
FIG. 3 is an exploded perspective view of the nightlight battery charger according to the above preferred embodiment of the present invention, wherein the terminal cover is detached from the main casing.

As shown in FIGS. 2 and 3, the two U-shaped panels 116 defining the two battery compartments are respectively extended to the front of the two side ridges 114 respectively, so as to define two holding slots 118 between the respective front edges 1161 of the two U-shaped panels 116 and the front wall 115A of the main casing 111. A perpendicular distance between the front wall 115A of the main casing 111 and the two front edges 1161 of the U-shaped panels 116 should be slightly larger than a thickness of the exchangeable lens card 16. Note that the pair of side ridges 114 acts as side boundaries of the two holding slots 118, wherein a distance between the two side ridges 114 should be slightly larger than a width of the exchangeable lens card 16, so as to allow the exchangeable lens card 16 to smoothly slide along the two holding slots 118.

The charger casing 11 further comprises a battery cover 112 detachably attached to a bottom side of the main casing 111 so as to cover the bottom openings 1171 of the two battery compartments 117 and the electric circuit 14 supported within the central interior cavity 1111 of the main casing 111. A first pair of terminals 13, which are electrically connected with each other, is respectively provided at two ends of the battery cover 112 and faces the two battery compartments 117 after the battery cover 112 is mounted to the bottom side of the main casing 111.

The front wall 115A of the main casing 111 further forms a lighting cavity 119 defined by a concave surface 119A indented on the front wall 115A and a central hole 1191 provided thereon for communicating the central interior cavity 1111 with the lighting cavity 119.

The nightlight system 12 comprises at least one illuminator 121, such as a small light bulb, securely mounted at the central hole 1191 to electrically connect with the power input 15 directly or via the electric circuit 14 for generating illumination. Moreover, when a light reflection material is coated on the concave surface 119A of the lighting cavity, the concave surface 119A functions as a reflecting surface for the illuminator 121 supported in the light cavity 119 to enhance its illumination.

The lens card 16, which is supported on top of the light cavity 119 by having its two sides be slid and held in the two holding slots 118, not only can cover and protect the illuminator 121 but also can be used to filter and/or color the light emitted from the illuminator 121. Therefore, by selectively replacing with different lens cards can substantially enhance entertainment, decorative and lighting effects of the nightlight battery charger.

According to the preferred embodiment of the present invention, the nightlight battery charger 10 comprises two pairs of battery terminals 13 affixed to two ends of the two battery compartments 117 respectively. Each pair of battery terminals 13 is adapted to contact with the positive and negative electrode terminals of each rechargeable battery, and electrically connected to the electric circuit 14 so as to transmit electricity from the electric circuit 14 to the rechargeable batteries for charging up the rechargeable batteries. Note that a conductive spring can be attached to the negative terminal of each battery compartment 117 to urge the rechargeable battery toward the positive terminal so as to keep the rechargeable battery in position inside the battery compartment 117 and to ensure the two electrode terminals of the rechargeable battery being in contact with the two terminals 13 of each battery compartment 117 respectively.

The electric circuit 14 is electrically connected to the two pair of battery terminals 13, the illuminator 121 and the power input 15. It is supported inside the main casing 111 and specifically designed for converting external A.C. power to electricity as received by the power input 15 to charge up the rechargeable batteries inside the two battery compartments 117 and to provide power to light up the illuminator 121. In other words, the electric circuit 14 can act as a coordinator to gather and process external A.C. electricity and distribute processed electricity to charge up the rechargeable batteries and to light up the illuminator 121 simultaneously.

Figure 4:
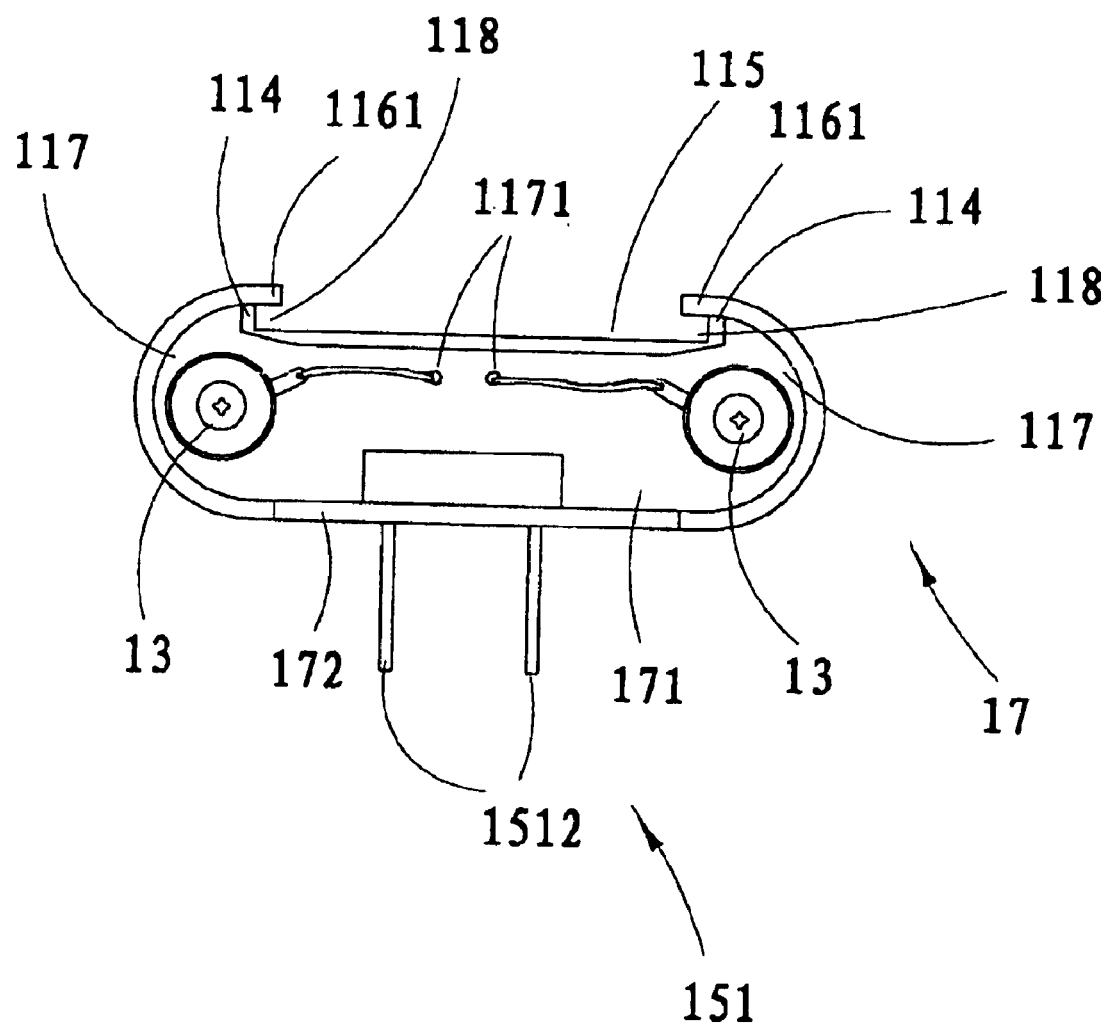
FIG. 4 is a bottom view of the charger casing of the nightlight battery charger according to the above preferred embodiment of the present invention.
Figure 5:
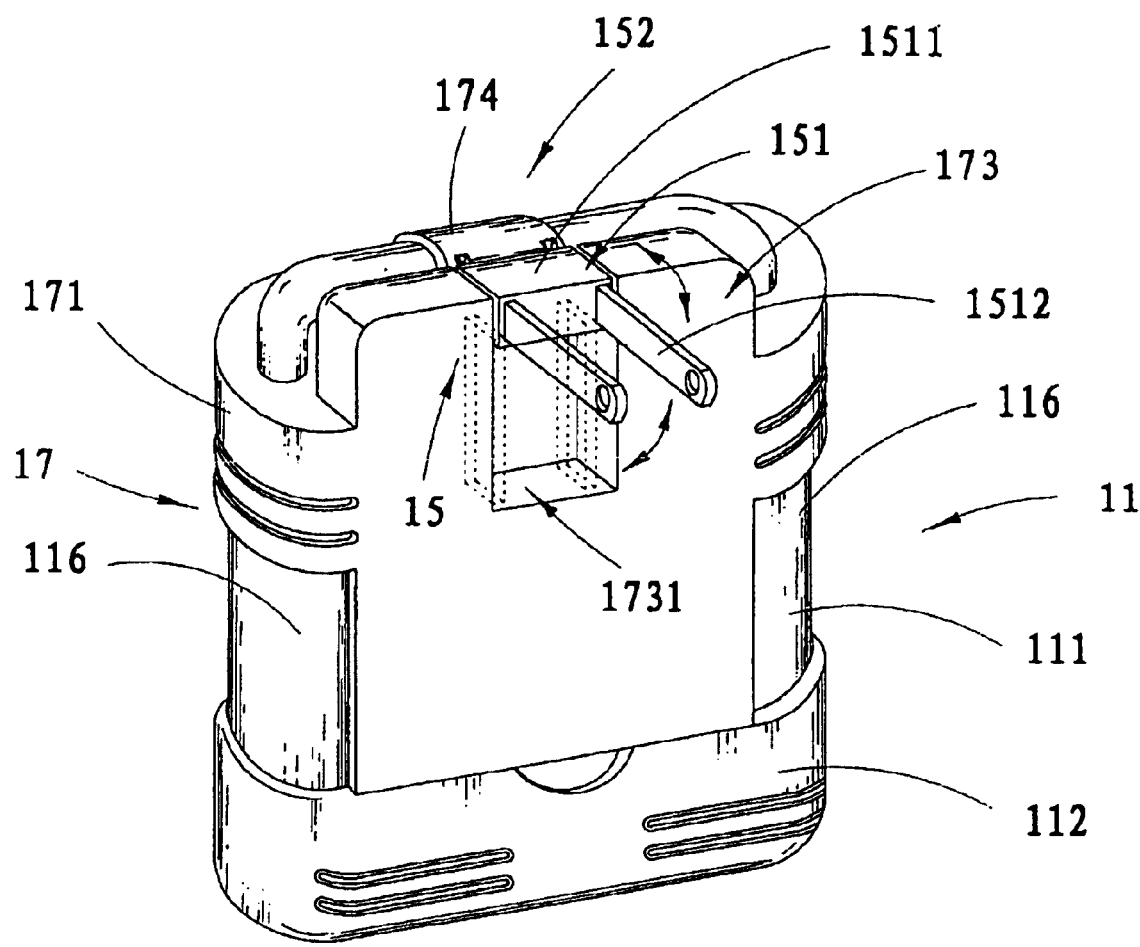
FIG. 5 is a back perspective view of the nightlight battery charger according to the above preferred embodiment of the present invention, illustrating the foldable plug unit adapted to be folding between an unfolded position and a folded up position.

Referring to FIGS. 2 to 6B, the charger casing 11 further comprises a power casing 17 to install the power unit 15, wherein the power casing 17 can be integrally constructed at a top side of the main casing 111. Alternatively, as embodied in the preferred embodiment of the present invention, the power casing 17 is made as an independent casing detachably connected to a top side of the main casing 111, as shown in FIG. 3. In which, the power casing 17 includes a battery head cover 171 constructed to be detachably attached to the top side of the main casing 111 so as to cover two top openings 1172 of the two battery compartments 117 and the central interior cavity 1111 of the main casing 111. As shown in FIG. 4, a second pair of terminals 13 is respectively provided at two ends of the battery head cover 171 and faces the two battery compartments 117 respectfully after the battery head cover 171 is mounted to the bottom side of the main casing 111. The pair of terminals 13 is electrically connected to the electric circuit 14 in the main casing 111.

The power casing 17 further comprises a back panel 172 which is downwardly extended from the battery head cover 171 to cover and support the bottom wall 115B and protruded two locking lips 1721 for engaging with the bottom wall 115B so as to securely fasten the power casing 17 with the main casing 111.

Referring to FIGS. 3 to 6B of the drawings, the power unit 15 comprises a foldable plug unit 151 and a power switch 152. The foldable plug unit 151 comprises a plug base 1511 pivotally mounted to the power casing 171, a pair of plug pins 1512 extended from the plug joint 1511, and a pair of switch terminal contact heads 153 which is protruded from a top inner corner edge of the plug base 1511 of the plug unit 151 and integrally extended from the pair of plug pins 1512 respectively into the switch housing 174.

The power casing 17 further comprises a plug housing 173 provided at a top back portion thereof for coupling with the plug unit 151 of the power input 15 and a switch housing 174 provided at a top front portion thereof to receive the power switch 152 of the power unit 15 therein.

Figure 6A:
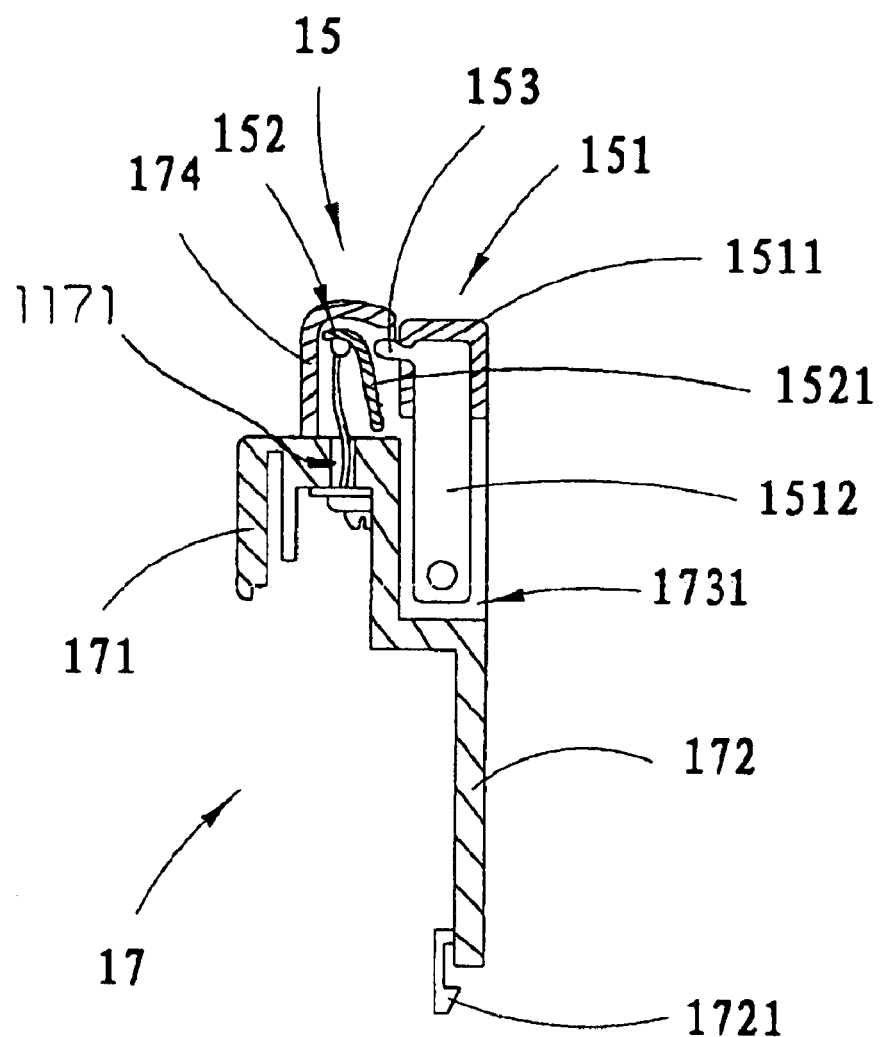
FIGS. 6A and 6B are sectional side views of the power cover of the nightlight battery charger according to the above preferred embodiment of the present invention, illustrating the electrically disconnecting and connecting position of the plug unit while it is unfolded or folded up respectively.
Figure 6B:
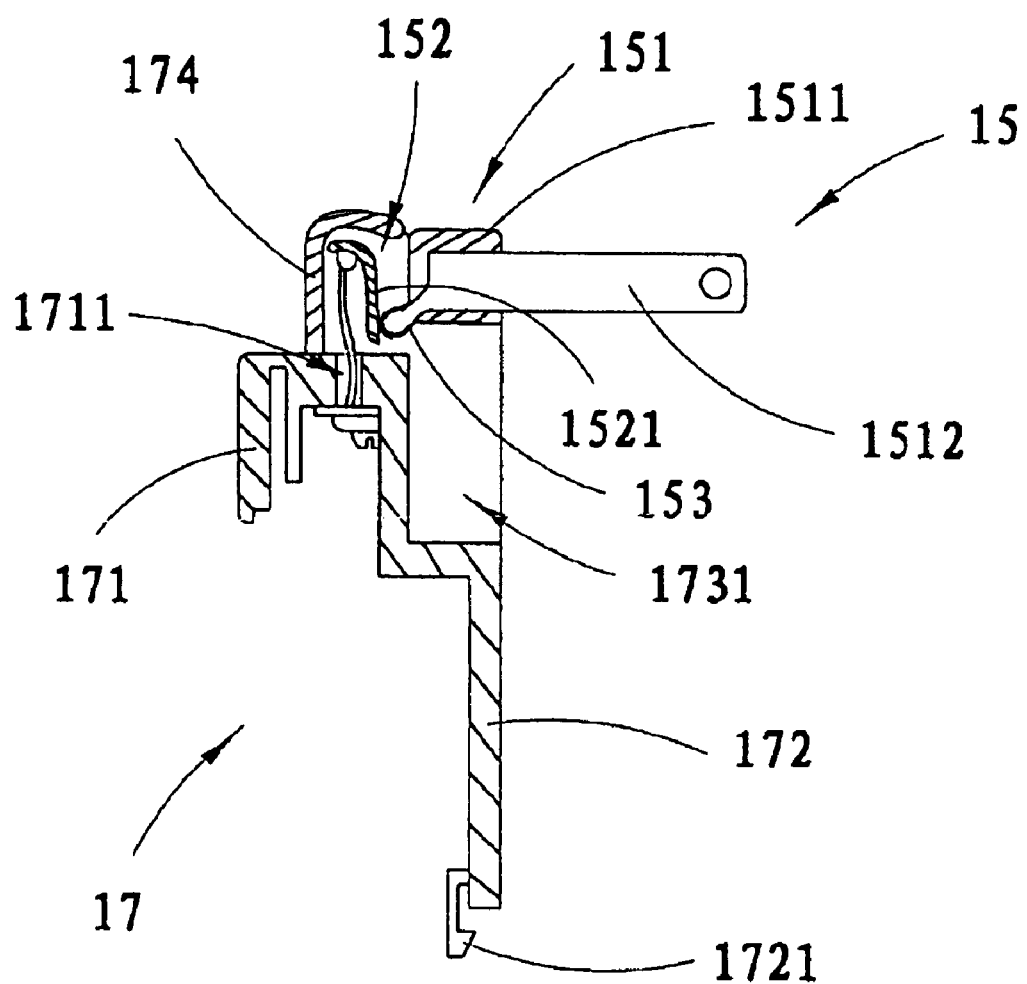

As shown in FIGS. 6A and 6B, the power switch 152 comprises a pair of power contacts 1521 which are disposed and supported inside the power housing 174 and electrically connected with the electric circuit 14, wherein the two power contacts 1521 are positioned with respect to the locations of the two switch terminal contact heads 153. Depending on different circuit design, the two power contacts 1521 can also be electrically connected with the second pair of terminals 13 through two wire holes 1711 provided on the battery head cover 171 to communicate the switch housing 174 with the battery compartments 117. Generally, the two power contacts 1521 serve as the power input terminals of the electric circuit 14.

The plug housing 173 has a plug chamber 1731 provided thereon and the plug base 1511 is pivotally connected at a top portion of the plug chamber 1731, so that when the plug unit 151 is not plugged to the wall socket, the plug unit 151 can be inwardly folded up to hide in the plug chamber 1731, i.e. a disconnecting condition, to facilitate storage and carrying purposes. As shown in FIG. 6A, at this disconnecting position, the two switch terminal heads 153 are positioned at an upper position and have no physical contact with the two power contacts 1521. Therefore, the plug unit 151 is electrically disconnected with the electric circuit 14 and the charged batteries inside the battery compartments 117 to prevent unwanted electrical contact with outside.

As shown in FIG. 6B, when the nightlight battery charger 10 of the present invention is in use, the plug unit 151 of the power input 15 can be unfolded out from the plug chamber 1731 to a connecting position that the plug pins 1512 are perpendicular to the charger casing 11 and the two switch terminal heads 153 are turned downwards to bias against bottom portions the two power contacts 1521 so that the two plug pins 1512 which are plugged into the wall socket are electrically connected with the electric circuit 14 inside the main casing 111 and provide electricity to light up the illuminator 121.

Whereby, a user is able to selectively and freely turn the plug unit 151 to either the disconnecting position for storage and carrying or the connecting position for plugging the nightlight battery charger 10 to a wall socket.

In other words, when the nightlight battery charger 10 is not in use, the user can rotate the plug unit 151 into the plug chamber 1731 so as to minimize the overall size of the nightlight battery charger 10. When the plug unit 151 is unfolded out and plugged into the wall socket, the electric power supply provides electricity to light up the illuminator 121 so that the battery charger is normally functioned as a nightlight whenever it is plugged to the wall socket. The electric circuit 14 is embodied as an electricity charging circuit that, when two batteries are installed in the two battery compartments 117 respectively and the first and second pairs of terminals 13 are respectively contacted with the end terminals of the batteries, the electric circuit 14 will charge the rechargeable batteries inside the two battery compartments 117 with the power supply through the wall socket and the plug unit 151.

Moreover, the light battery charger 10 can further comprise a light sensor 122 electrically connected with the illuminator 121 to function as a sensor switch of the illuminator 121 to control when the illuminator 121 should be lightened up. During the day time or other light source existing in the environment, the light sensor 122 detects a predetermined intensity of light and switches off the illuminator 121. However, when the light sensor 122 does not detect enough light intensity, the illuminator 121 is switched on to supply power to light it up for illumination.

The exchangeable lens card 16 has two side edges 161 adapted for fittedly sliding into the two holding slots 118. In light of this, the two side edges 161 of the exchangeable lens cards 16 should has a thickness slightly smaller than the thickness of the holding slots 118 so that the exchangeable lens card 16 can be slid along the two holding slots 118 smoothly. In order to increase and enhance the entertainment and lighting effect of the nightlight battery charger, the exchangeable lens card 16 can be manufactured in a variety of species such as a fashionable character figurine, different colored lens cards, a magnifying lens card, a frost lens card and the likes. A user of the nightlight battery charger 10 is free to choose his/her favorite lens card for maximum satisfaction. What he/she needs to do is to just remove the original lens card by sliding it out of the holding slots 118 and slide his/her favorite lens card into the holding slots 118. The nightlight battery charger is especially good to couple with the portable electronic game device, such as the "Game Boy Advance", which needs to use batteries for power supply. The kids can carry the nightlight battery charger 10 of the present invention with their portable electronic game devices elsewhere they travel. The users have no need to worry about lack of powers and, at the same time, it can be functioned as a nightlight while it is recharging the batteries.

Referring to FIG. 1 of the drawings, the battery cover 112 has a positioning indentation 1121 formed on its bottom portion so as to avoid the exchangeable lens card 16 from undesirable up-and-down movement. Accordingly, the exchangeable lens card 16 further has a protrusion 162 protruded from an inner surface of the exchangeable lens card 16 and adapted to engage with the positioning indentation 1121 of the battery cover 112. When the main casing 111 is closed by the bottom cover 112, and when the protrusion 162 is engaged with the positioning indentation 1121 of the bottom cover, the exchangeable lens card 16 is retained in position by the positioning indentation 1121 and the two holding slots 118. In order to remove the exchangeable lens card 16 from the nightlight battery charger 10, one has to slightly push the top portion of the exchangeable lens card 16 so as to disengage its protrusion 162 from the positioning indentation 17. Then, he/she can slide out the exchangeable lens card 16 along the two holding slots 118.

In addition, it is worth to mention that the nightlight battery charger 10 can be equipped with a manual switch 20 which is provided on the charger casing 11 and electrically connected to the electric circuit 14 for selectively switching on/off the nightlight system 12. Thus, when the user wants to recharge a rechargeable battery during daytime and he/she doesn't want to switch on the nightlight simultaneously with the charging function, he/she can choose to switch off the nightlight using the switch 20 even when the nightlight battery charger 10 is charging his/her rechargeable battery.

According to the preferred embodiment of the present invention, the battery cover 112 also has a pair of sliding grooves 1122 vertically formed at two side portions of the battery cover 112 and well aligned with the two holding slots 118 of the main casing 111, and adapted for the exchangeable lens card 16 to be slid therein. Accordingly, when the battery cover 112 is engaged with the main casing 111, the exchangeable lens card has to slide into the sliding grooves 1122 first and then to the holding slots 118 in order for the exchangeable lens cards 16 to be mounted onto the charger casing 11. However, the battery cover 112 can be designed not to include the two sliding grooves 1122 and can be just used to cover the two battery compartments 117.

In order to operate the nightlight battery charger 10 of the present invention, one has to open the battery cover 112 of the charger casing 11 and inserts two rechargeable batteries into the two battery compartments 117 respectively. The user then has to close the battery cover 112 of the charger casing 11 and rotate the electricity plug 151 from the disconnecting position to the perpendicular connecting position. Then, plug the plug pins 1512 into an external A.C. wall socket to recharge the two rechargeable batteries inside the battery compartments 117. At the time the external A.C. supply is connected to the nightlight battery charger 10, the illuminator 121 of the nightlight system 12 will then be lighted up to provide nightlight. So, the nightlight battery charger 10 of the present invention provides charging and nightlight simultaneously.

According to the preferred embodiment of the present invention, the electric circuit 14 is so designed that when the rechargeable batteries are recharged fully, charging process will be stopped immediately while keeping the nightlight system 12 intact. Furthermore, when a user only wants to have nightlights without needing the charging function, he/she can simply plug the nightlight battery charger 10 into an external A.C. power supply without inserting any rechargeable battery into the nightlight battery charger 10. Under this circumstance, the nightlight battery charger 10 will then just act as a nightlight and provide nightlight function only.

What is claimed is:

1. A nightlight battery charger, comprising:

a charger casing having an interior cavity and at least a battery compartment defined therein;

a nightlight system, which is supported in said charger casing, comprising at least an illuminator for generating illumination;

a plurality of battery terminals provided in said battery compartment respectfully for electrically contacting with terminal ends of a rechargeable battery disposed in said battery compartment;

a power input supplying power to light up said illuminator; and a recharging electric circuit provided in said charger casing and electrically connected with said terminals and said power input for supplying electricity power to charge up said rechargeable battery in said battery compartment, wherein said charger casing comprises a main casing defining said central interior cavity between a front wall and a bottom wall thereof for storing and supporting said electric circuit and said battery compartment is formed at one side of said central interior cavity while another battery compartment is formed at another side of said central interior cavity, wherein said main casing has a pair side ridges frontwardly and integrally extended at two side edges of said front wall of said main casing and a pair of U-shaped panels integrally provided at two side portions thereof to define said two battery compartments respectively.

2. The nightlight battery charger, as recited in claim 1, wherein said charger casing further comprises a battery cover detachably attached to a bottom side of said main casing so as to cover bottom openings of said two battery compartments and said electric circuit supported within said central interior cavity of said main casing.

3. The nightlight battery charger, as recited in claim 2, wherein a first pair of said battery terminals, which are electrically connected with each other, is respectively provided at two ends of said battery cover and facing said two battery compartments after said battery cover is mounted to said bottom side of said main casing.

4. The nightlight battery charger, as recited in claim 3, wherein on said front wall of said main casing further forms a lighting cavity defined by a concave surface indented on said front wall and a central hole provided thereon for communicating said central interior cavity with said lighting cavity, wherein said illuminator is securely mounted at said central hole to electrically connect with said power input, wherein a light reflection material is coated on said concave surface of said lighting cavity to render said concave surface forming a reflecting surface for said illuminator supported in said light cavity.

5. The nightlight battery charger, as recited in claim 4, wherein said nightlight system further comprises an exchangeable lens card detachably attached to cover and protect said illuminator, wherein said two U-shaped panels defining said two battery compartments are respectively extended to in front of said two side ridges respectively, so as to define two holding slots between front edges of said two U-shaped panels and said front wall of said main casing, wherein a perpendicular distance between said front wall of said main casing and said two front edges of said U-shaped panels is slightly larger than a thickness of said exchangeable lens card, wherein said pair of side ridges acts as side boundaries of said two holding slots while a distance between said two side ridges is slightly larger than a width of said exchangeable lens card, so as to allow said exchangeable lens card to smoothly slide along said two holding slots to cover said illuminator.

6. The nightlight battery charger, as recited in claim 3, wherein a second pair of said battery terminals are provided to two ends of said two battery compartments respectively, whereby each of said first and second pairs of said battery terminals is adapted to contact with two electrode terminals of each rechargeable battery, wherein said second pair of said battery terminals are electrically connected to said electric circuit whereby electricity is transmitted from said electric circuit to said rechargeable batteries for charging up said rechargeable batteries.

7. The nightlight battery charger, as recited in claim 5, wherein a second pair of said battery terminals are provided to two ends of said two battery compartments respectively, whereby each of said first and second pairs of said battery terminals is adapted to contact with two electrode terminals of each rechargeable battery, wherein said second pair of said battery terminals are electrically connected to said electric circuit whereby electricity is transmitted from said electric circuit to said rechargeable batteries for charging up said rechargeable batteries.

8. The nightlight battery charger, as recited in claim 5, wherein said power in put comprises a power unit and said charger casing further comprises a power casing to install said power unit, wherein said power casing is detachably connected to a top side of said main casing and includes a battery head cover constructed to be detachably attached to said top side of said main casing so as to cover two top openings of said two battery compartments and said central interior cavity of said main casing, wherein said plug unit includes a plug base pivotally mounted to said power casing and a pair of plug pins extended from said plug joint, wherein said power casing has a plug housing which has a plug chamber provided thereon and said plug base is pivotally connected at a top portion of said plug chamber, so that when said plug unit is capable of inwardly folding up to hide within said plug chamber said plug unit is not in use.

9. The nightlight battery charger, as recited in claim 8, wherein said power input further comprises a power switch and said power casing has a switch housing provided at a top front portion thereof to receive said power switch, wherein said power switch comprises a pair of power contacts which are disposed and supported inside said power housing and electrically connected with said electric circuit, wherein said two power contacts are positioned respective to said locations of said two switch terminal contact heads, wherein when said plug unit is not in use, said plug unit is able to be inwardly folded up to hide within said plug chamber, and said two switch terminal heads are positioned at an upper position and have no physical contact with said two power contacts, so that said plug unit is electrically disconnected with said electric circuit;

wherein when said nightlight battery charger of said present invention is in use, said plug unit of said power input is able to be unfolded out from said plug chamber to a connecting position that said plug pins are turned to bias against said two power contacts so that said two plug pins are electrically connected with said electric circuit inside said main casing.

10. The nightlight battery charger, as recited in claim 7, wherein said power in put comprises a power unit and said charger casing further comprises a power casing to install said power unit, wherein said power casing is detachably connected to a top side of said main casing and includes a battery head cover constructed to be detachably attached to said top side of said main casing so as to cover two top openings of said two battery compartments and said central interior cavity of said main casing, wherein said plug unit includes a plug base pivotally mounted to said power casing and a pair of plug pins extended from said plug joint, wherein said power casing has a plug housing which has a plug chamber provided thereon and said plug base is pivotally connected at a top portion of said plug chamber, so that when said plug unit is capable of inwardly folding up to hide within said plug chamber said plug unit is not in use.

11. The nightlight battery charger, as recited in claim 10, wherein said power input further comprises a power switch and said power casing has a switch housing provided at a top front portion thereof to receive said power switch, wherein said power switch comprises a pair of power contacts which are disposed and supported inside said power housing and electrically connected with said electric circuit, wherein said two power contacts are positioned respective to said locations of said two switch terminal contact heads, wherein when said plug unit is not in use, said plug unit is able to be inwardly folded up to hide within said plug chamber, and said two switch terminal heads are positioned at an upper position and have no physical contact with said two power contacts, so that said plug unit is electrically disconnected with said electric circuit;

wherein when said nightlight battery charger of said present invention is in use, said plug unit of said power input is able to be unfolded out from said plug chamber to a connecting position that said plug pins are turned to bias against said two power contacts so that said two plug pins are electrically connected with said electric circuit inside said main casing;

wherein said two power contacts are electrically connected with said second pair of said battery terminals through two wire holes provided on said battery head cover to communicate said switch housing with said battery compartments.

12. A nightlight battery charger, comprising:

a charger casing having an interior cavity and at least a battery compartment defined therein;

a nightlight system, which is supported in said charger casing, comprising at least an illuminator for generating illumination and an exchangeable lens card detachably attached to cover and protect said illuminator, a plurality of battery terminals provided in said battery compartment respectfully for electrically contacting with terminal ends of a rechargeable battery disposed in said battery compartment;

a power input supplying power to light up said illuminator; and a recharging electric circuit provided in said charger casing and electrically connected with said terminals and said power input for supplying electricity power to charge up said rechargeable battery in said battery compartment, wherein said charger casing comprises a main casing defining said central interior cavity between a front wall and a bottom wall thereof for storing and supporting said electric circuit and said battery compartment is formed at one side of said central interior cavity while another battery compartment is formed at another side of said central interior cavity, wherein on said front wall of said main casing further forms a lighting cavity defined by a concave surface indented on said front wall and a central hole provided thereon for communicating said central interior cavity with said lighting cavity, wherein said illuminator is securely mounted at said central hole to electrically connect with said power input, wherein a light reflection material is coated on said concave surface of said lighting cavity to render said concave surface forming a reflecting surface for said illuminator supported in said light cavity;

wherein two U-shaped panels defining said two battery compartments are respectively extended to in front of two side ridges, which are frontwardly and integrally extended at two side edges of said front wall of said main casing, respectively, so as to define two holding slots between front edges of said two U-shaped panels and said front wall of said main casing, wherein a perpendicular distance between said front wall of said main casing and said two front edges of said U-shaped panels is slightly larger than a thickness of said exchangeable lens card, wherein said pair of side ridges acts as side boundaries of said two holding slots while a distance between said two side ridges is slightly larger than a width of said exchangeable lens card, so as to allow said exchangeable lens card to smoothly slide along said two holding slots to cover said illuminator.

* * * * *